United States Patent
Hao (10) Patent No.: US 11,099,657 B2
(45) Date of Patent: Aug. 24, 2021

(54) REMOTE INFORMATION INPUT METHOD, DEVICE AND SYSTEM

(71) Applicant: BOE TECHNOLOGY GROUP CO., LTD., Beijing (CN)

(72) Inventor: Zhenxing Hao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/675,534

(22) Filed: Nov. 6, 2019

(65) Prior Publication Data

US 2020/0310555 A1    Oct. 1, 2020

(30) Foreign Application Priority Data

Mar. 29, 2019 (CN) .......................... 201910250562.4

(51) Int. Cl.
*G06F 3/023* (2006.01)
*G06T 7/73* (2017.01)
*G06F 3/01* (2006.01)

(52) U.S. Cl.
CPC ............ *G06F 3/0236* (2013.01); *G06F 3/018* (2013.01); *G06T 7/74* (2017.01)

(58) Field of Classification Search
CPC ........ G06F 3/0236; G06F 3/018; G06F 3/023; G06F 9/451; G06F 3/0233; G06F 3/1454; G06T 7/74; H03M 11/00
See application file for complete search history.

(56) References Cited

U.S. PATENT DOCUMENTS

2010/0138780 A1* 6/2010 Marano ................... G06F 3/147
715/804

\* cited by examiner

*Primary Examiner* — Andrey Belousov (57) ABSTRACT

Remote information input method, device and system are disclosed. The method includes: receiving a screen snapshot of a terminal device and sending the screen snapshot to a remote input device; receiving a keyboard input instruction from the remote input device, the keyboard input instruction including an identification of the terminal device and a keyboard code; determining a corresponding target key in the terminal device based on the keyboard code and a key code mapping table; identifying the screen snapshot of the terminal device and determining whether the target key exists in the screen snapshot; acquiring a coordinate of the target key in a screen snapshot in response to determining that the target key exists in the screen snapshot; and sending a click instruction to the terminal device, according to the coordinate of the target key in the screen snapshot and the identification of the terminal device.

15 Claims, 10 Drawing Sheets

REMOTE INFORMATION INPUT METHOD, DEVICE AND SYSTEM

The present application claims priority of the Chinese Patent Application No. 201910250562.4, filed on Mar. 29, 2019, the entire disclosure of which is incorporated herein by reference as part of the present application.

TECHNICAL FIELD

Embodiments of the present invention relate to a remote information input method, device and system.

BACKGROUND

With the popularity of mobile devices, the need for remote control of the mobile devices arises. In the prior remote control technologies, a user can input English characters or numbers on a remote input device only by operating a virtual keyboard displayed on a mobile device through a mouse, however, cannot remotely input through a keyboard or cannot input Chinese.

SUMMARY

According to a first aspect of embodiments of the present invention, a remote information input method is provided. The method applied to a server device includes: receiving a screen snapshot of a terminal device and sending the screen snapshot to a remote input device; receiving a keyboard input instruction from the remote input device, in which the keyboard input instruction includes an identification of the terminal device and a keyboard code; determining a corresponding target key in the terminal device based on the keyboard code and a key code mapping table; identifying the screen snapshot of the terminal device and determining whether the target key exists in the screen snapshot; acquiring a coordinate of the target key in a screen snapshot in response to determining that the target key exists in the screen snapshot; and sending a click instruction to the terminal device, according to the coordinate of the target key in the screen snapshot and the identification of the terminal device.

For example, in an embodiment, the method further includes receiving a mouse input instruction from the remote input device. The mouse input instruction includes the identification of the terminal device and a location coordinate of a mouse click.

For example, in an embodiment, the method is used for terminal device testing, and the terminal device is at least one terminal device to be tested.

For example, in an embodiment, the method further includes: receiving a first snapshot capturing instruction sent by the remote input device, in which the first snapshot capturing instruction includes the identification of the terminal device; sending a second snapshot capturing instruction to the terminal device according to the identification of the terminal device, and receiving a screen snapshot returned by the terminal device; and sending a received screen snapshot to the remote input device and caching in a server.

For example, in an embodiment, the method further includes: receiving a current screen snapshot of the terminal device sent by a distribution device which is communicably connected with the terminal device; and sending and caching a current screen snapshot to the remote input device.

For example, in an embodiment, before acquiring the screen snapshot of the terminal device and identifying whether the target key exists in the screen snapshot, the method further includes: detecting whether the target key exists in a key-code library of the terminal device; and if yes, performing a step of acquiring the screen snapshot of the terminal device and identifying whether the target key exists in the screen snapshot.

For example, in an embodiment, the acquiring the screen snapshot of the terminal device and identifying whether the target key exists in the screen snapshot includes: acquiring an image of a designated area of the screen snapshot to obtain a target screen snapshot; comparing the target screen snapshot with keyboard templates in a pre-stored keyboard template library to determine a target input method currently invoked by the terminal device; acquiring a target key image corresponding to a target input method according to the target key value; and identifying whether the target key exists in the target screen snapshot according to the target key image.

For example, in an embodiment, in a case where the target key exists in the screen snapshot, acquiring the coordinates of the target key in the screen snapshot includes: acquiring a coordinate of the target key in the target screen snapshot in a case where the target key exists in the target screen snapshot; and acquiring the coordinates of the target key in the screen snapshot according to the coordinate of the target key in the target screen snapshot and a positional relationship between the target screen snapshot and the screen snapshot.

According to a second aspect of embodiments of the present invention, a remote information input method is also provided. The method applied to a remote input device includes: synchronizing a screen of the remote input device with a screen of a terminal device; and monitoring an input instruction and sending a keyboard input instruction which includes a keyboard code to a server when the keyboard input instruction is detected.

For example, in an embodiment, the input instruction further includes a mouse input instruction, and when the mouse input instruction is detected, the mouse input instruction which includes an identification of the terminal device and a location coordinate of a mouse click is sent to the server.

According to a third aspect of embodiments of the present invention, a remote information input method is further provided. The method applied to an information input system which includes a remote input device, a server and a terminal device, with the remote input device communicably connected with the server and the server communicably connected with the terminal device, includes: synchronizing a screen of the remote input device with a screen of the terminal device; the remote input device monitoring an input instruction, and sending a detected input instruction which includes a keyboard input instruction that includes a keyboard code and an identification of the terminal device to the server; the server receiving a screen snapshot of the terminal device in response to the input instruction and determining a corresponding target key in the terminal device based on the keyboard code and a key code mapping table; the server identifying the screen snapshot of the terminal device and determining whether the target key exists in the screen snapshot; the server acquiring a coordinate of the target key in a screen snapshot in response to determining that the target key exists in the screen snapshot; the server sending a click instruction to the terminal device according to the coordinate of the target key in the screen snapshot and the identification of the terminal device; and the terminal device determining input information according to the click instruction.

According to a fourth aspect of embodiments of the present invention, a remote information input system which performs the method described above is provided. The remote information input system includes: a remote input device, a server and a terminal device, with the input device communicably connected with the server and the server communicably connected with the terminal device. A screen of the remote input device is synchronized with a screen of the terminal device; the remote input device monitors an input instruction which includes a keyboard input instruction that includes a keyboard code and an identification of the terminal device and sends a detected input instruction to the server; the server, in response to the input instruction, receives a screen snapshot of the terminal device and determines a corresponding target key in the terminal device based on the keyboard code and a key code mapping table; the server identifies the screen snapshot of the terminal device and determines whether a target key exists in a screen snapshot; the server, in response to determining that the target key exists in the screen snapshot, acquires coordinates of the target key in the screen snapshot; the server is further configured to send a click instruction to the terminal device according to the coordinate of the target key in the screen snapshot and the identification of the terminal device; and the terminal device is configured to determine input information according to the click instruction.

For example, in an embodiment, the system further includes a distribution device. A distribution device is communicably connected with the server and the terminal device, and the distribution device sends a current screen snapshot of the terminal device to the server, and sends a click instruction of the server to the terminal device.

For example, in an embodiment, the server is further configured to receive a mouse input instruction from the remote input device, and the mouse input instruction includes an identification of the terminal device and a location coordinate of a mouse click.

For example, in an embodiment, the system is used for terminal device testing, and the terminal device is at least one terminal device to be tested.

According to a fifth aspect of embodiments of the present invention, a server device including a processor and a memory is provided. The memory is used for storing computer programs; and the processor is used for executing computer programs stored on the memory to perform the method described above.

According to a sixth aspect of embodiments of the present invention, a computer-readable storage medium is provided. The computer-readable storage medium stores computer programs that when executed by a processor cause the processor to perform the method described above.

According to a seventh aspect of embodiments of the present invention, a remote input device including a processor and a memory is provided. The memory is used for storing computer programs; and the processor is used for executing computer programs stored on the memory to perform the method described above.

According to an eighth aspect of embodiments of the present invention, computer-readable storage medium is also provided. The computer-readable storage medium stores computer programs that when executed by a processor cause the processor to perform the method described above.

According to the above embodiments, when an input device is displaying a screen snapshot of a terminal device to be tested, if a keyboard input instruction is detected, the keyboard input instruction is sent to a server, and the server determines a corresponding target key according to an encoded value in the received keyboard input instruction and a key code mapping table, then the server acquires the screen snapshot of the terminal device to be tested and identifies whether the target key exists in the screen snapshot. In a case where the target key exists in the screen snapshot, the server acquires coordinates of the target key in the screen snapshot, and sends a click instruction to the terminal device to be tested according to the coordinate of the target key in the screen snapshot and an identification of the terminal device to be tested, and the terminal device to be tested determines input information according to the click instruction. As such, information may be input to a remote terminal device to be tested through a keyboard, and the efficiency and convenience of information input may be improved.

It should be understood that the above general description and the following detailed description are exemplary and explanatory only and are not restrictive of the invention.

BRIEF DESCRIPTION OF THE DRAWINGS

The accompanying drawings, which are incorporated in this specification and constitute a part of this specification, illustrate the embodiments consistent with the invention and serve to explain the principles of the invention together with this specification.

DETAILED DESCRIPTION

Exemplary embodiments will be described in detail herein, examples of which are illustrated in the accompanying drawings. When the following description refers to the drawings, unless otherwise indicated, like numbers in different drawings indicate like or similar elements. The implementations described in the following exemplary examples do not represent all implementations consistent with the present invention. On the contrary, they are merely examples of devices and methods consistent with some aspects of the present invention as detailed in the appended claims.

The invention provides a remote control method, device and system for a terminal device, which may input characters to the terminal device through a keyboard of a remote input device, thereby improving the efficiency and convenience of remotely inputting characters or instructions. The invention, through the keyboard of the remote input device and by means of the image processing and identifying technologies, simulates to click on a virtual keyboard on the terminal device, so that the effect is more real, and the use experience of users is improved.

For ease of understanding, the following description will be made with reference to some specific embodiments.

In an example, a method of the present invention may be applied to real machine testing of mobile APPs. With the development of mobile technology, mobile APPs (application programs) emerge in endlessly, which puts forward higher requirements for real machine testing. In order to carry out the test, it is often necessary to purchase a large number of different models of mobile devices, however, the mobile devices are updated quickly and have a huge number of models, which may take a large cost, and they are not convenient for storage. Therefore, with the aid of the method and system of the present invention and cloud server test platforms, such problems may be solved.

The test platforms in related technologies only support users to operate virtual keyboards of mobile phones through mouse pointers. In the Chinese mode, input contents of the keyboard are English characters corresponding to keys, and the respective Chinese characters cannot be spelled.

The embodiments of the present invention provide a remote information input method, device and system, which are used for solving the above technical problems, and can input information to a terminal device to be tested at a distance through a keyboard, thereby improving the efficiency and convenience of information input.

Figure 1:
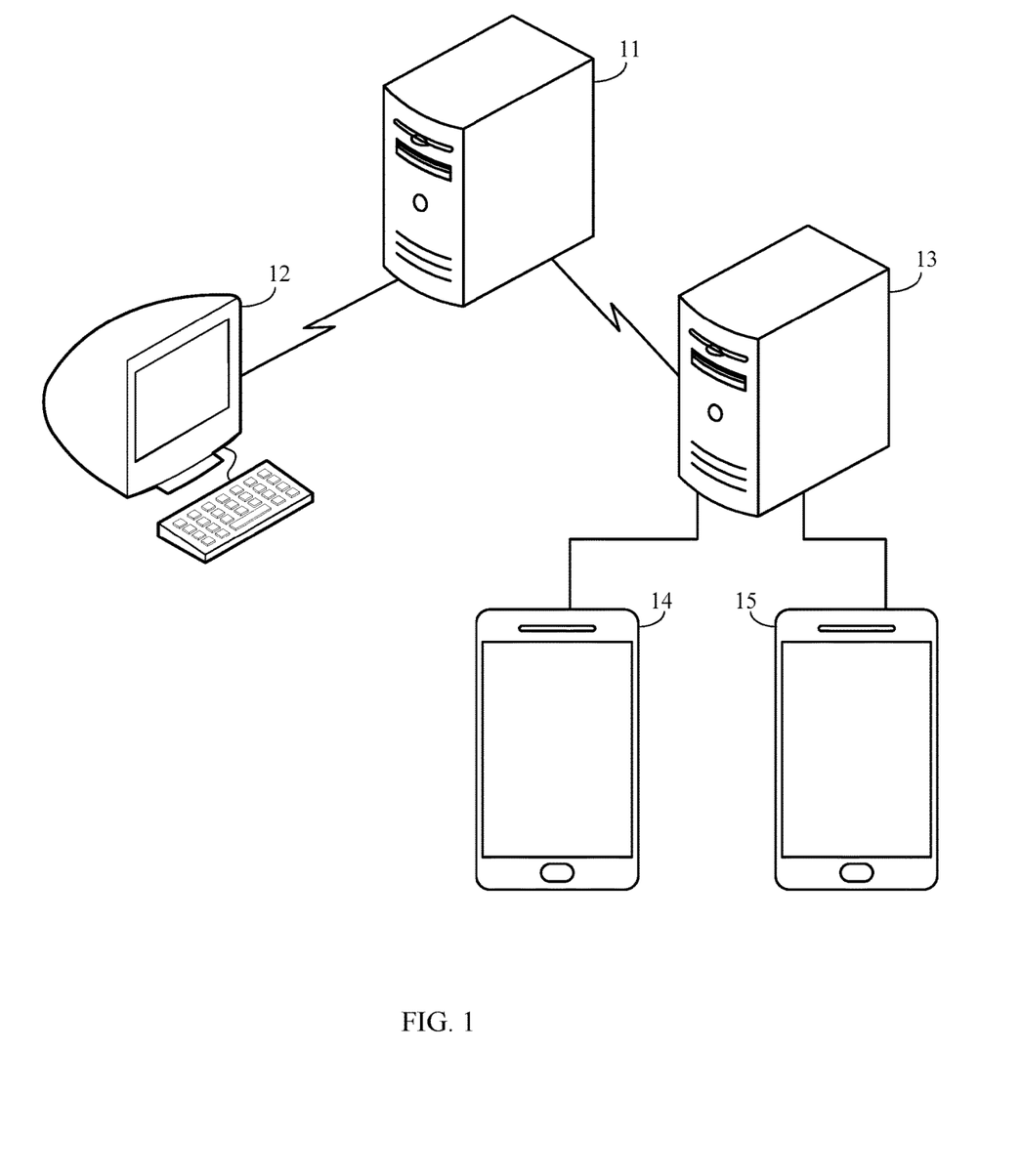
FIG. 1 is a schematic structural diagram of a remote information input system according to the embodiments of the present invention.

A remote information input method provided by the embodiments of the present invention may be applied to a remote information input system as illustrated in FIG. 1, and the remote information input system may be applied to real machine testing. In the following embodiments, a real machine test application scenario is taken as an example for introduction, however, it should be understood that the application scenario of the remote information input system of the present invention is not limited to this, instead, it can be any application scenario that applicable to inputting remotely information to a terminal. In prior to the remote information input method, the remote information input system is briefly introduced.

As illustrated in FIG. 1, the remote information input system may include a server 11, an input device 12, a terminal device to be tested 14 and a terminal device to be tested 15. There may be more than two terminal devices to be tested. The input device 12 may be a computer and communicably connected with the server 11. Alternatively, the remote information system may further include a distribution device 13. A distribution device may be, for example, a client computer, which is used to connect each terminal device, monitor a screen of the connected terminal device, preprocess a screen snapshot, and distribute instructions transmitted by the server to the connected terminals and the like. In this embodiment, the server 11 is communicably connected with the distribution device 13, and the distribution device 13 is communicably connected with the terminal device to be tested 14 and the terminal device to be tested 15. The input device 12 is used to display a screen snapshot of the terminal device to be tested 14 (or the terminal device to be tested 15) sent from the server 11, receive a mouse input instruction or a keyboard input instruction from a user and send the received mouse input instruction or keyboard input instruction to the server 11. The server 11 generates a corresponding virtual keyboard click instruction based on the mouse input instruction or the keyboard input instruction, and then sends a click instruction to the terminal device to be tested 14 (or the terminal device to be tested 15), and the terminal device to be tested 14 (or the terminal device to be tested 15) determines input information according to the click instruction.

Figure 2:
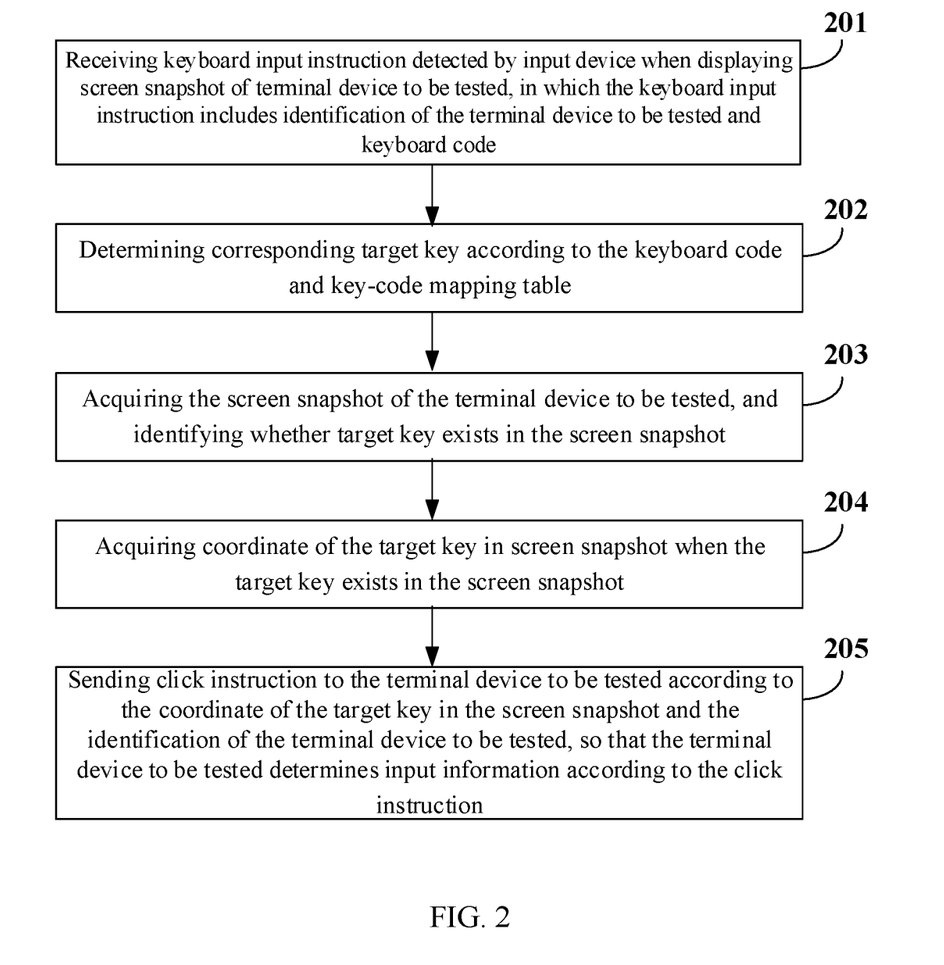
FIG. 2 is a flowchart of a remote information input method according to the embodiments of the present invention.

FIG. 2 illustrates a remote information input method according to the embodiments of the present invention. This method may be applied to the server 11. The server 11 may be a cloud server, but is not limited thereto. The remote information input method may include the following steps 201 to 205:

In step 201, receiving a keyboard input instruction detected by an input device when displaying a screen snapshot of a terminal device to be tested, in which the keyboard input instruction includes an identification of the terminal device to be tested and an encoded value.

Figure 3:
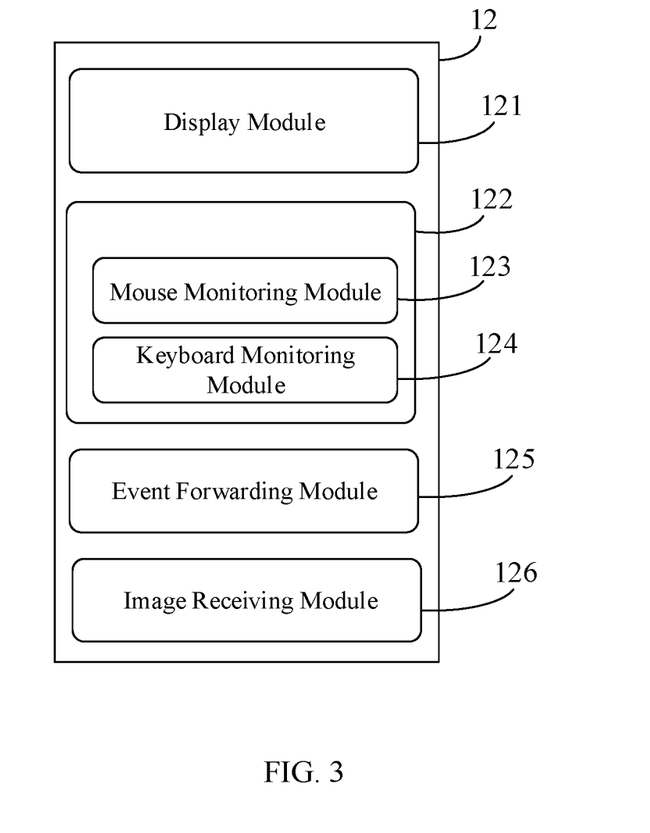
FIG. 3 is a schematic structural diagram of a remote input device according to the embodiments of the present invention.

In an embodiment, the input device 12 may include a display module 121, a monitoring module 122, an event forwarding module 125 and an image receiving module 126, as illustrated in FIG. 3. Testing the terminal device to be tested 14 is taken as an example for illustrating. The image receiving module 126 is configured to receive a synchronization signal of the terminal device to be tested 14 sent from the server 11. The display module 121 is configured to perform synchronous display with a screen of the terminal device to be tested 14 according to the synchronization signal. The monitoring module 122 is configured to detect an input instruction and send the detected input instruction to the event forwarding module 125, and the event forwarding module 125 is configured to send the received input instruction to the server 11. Specifically, the monitoring module 122 includes a mouse monitoring module 123 and a keyboard monitoring module 124. The mouse monitoring module 123 is used for detecting a mouse input instruction, and the keyboard monitoring module 124 is used for detecting a keyboard input instruction. The mouse input instruction includes an identification of the terminal device to be tested 14 and a location coordinate of a mouse click. The keyboard input instruction includes the identification of the terminal device to be tested 14 and an encoded value. The encoded value may be, for example, a Unicode (uniform code) encoded value, but is not limited thereto. Each encoded value corresponds to a key value. If the input device 12 monitors a keyboard input instruction when displaying a screen snapshot of the terminal device to be tested 14, the detected keyboard input instruction is sent to the server 11.

Figure 4:
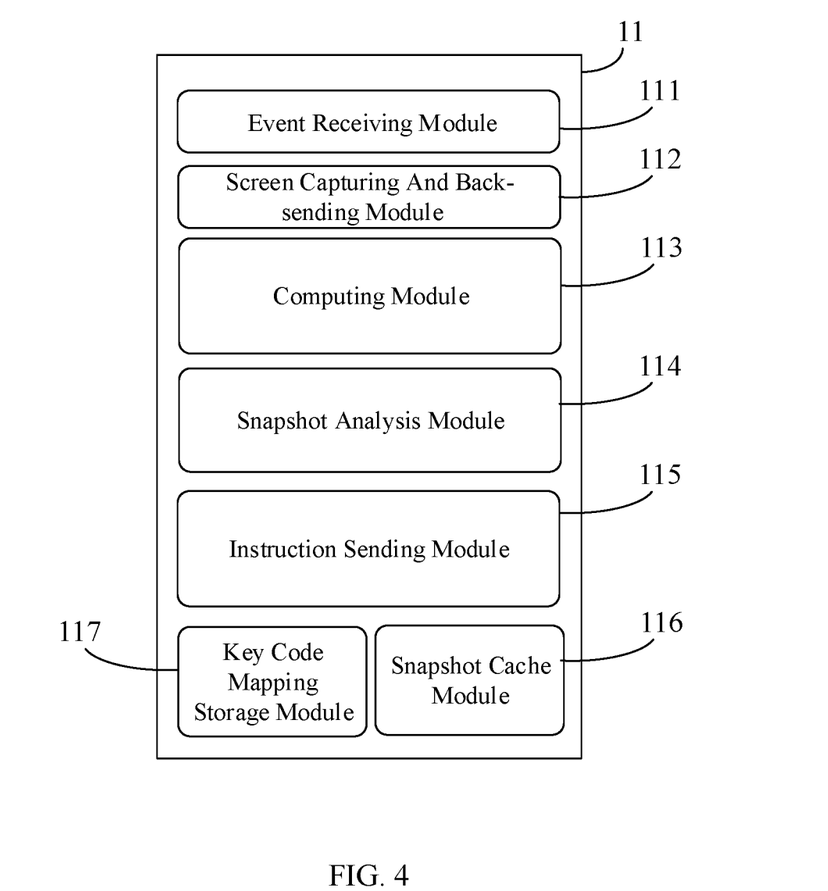
FIG. 4 is a schematic structural diagram of a server device according to the embodiments of the present invention.

In an embodiment, as illustrated in FIG. 4, the server 11 may include an event receiving module 111, a screen capturing and back-sending module 112 and a snapshot cache module 116. The screen capturing and back-sending module 112 is configured to receive a screen snapshot of the terminal device to be tested 14 sent by the distribution device 13, send the received screen snapshot of the terminal device to be tested 14 to the input device 12, and cache the received screen snapshot of the terminal device to be tested 14 to the snapshot cache module 116. The event receiving module 111 is configured to receive an input instruction sent by the input device 12. After the input instruction sent by the input device 12 is received, the server 11 distinguishes the received input instruction, and when the received input instruction is determined as a keyboard input instruction, the process proceeds to step 202.

Of course, if the input device 12 monitors a mouse input instruction when displaying a screen snapshot of the terminal device to be tested 14, the detected mouse input instruction is sent to the server 11. The server 11 will generate a corresponding click instruction according to a location coordinate of a mouse click in the mouse input instruction and an identification of the terminal device to be tested 14, and send the click instruction to the terminal device to be tested 14, so that the terminal device 14 may determine input information according to the click instruction.

In step 202, determining a corresponding target key according to the encoded value and a key code mapping table.

In an embodiment, as illustrated in FIG. 4, the server 11 may also include a computing module 113 and a key value mapping storage module 117. The key value mapping storage module 117 is used to store a key code mapping table, and the key code mapping table contains one-to-one correspondence between encoded values and key values.

In an embodiment, after the server 11 receives a keyboard input instruction, the computing module 113 may query a key code mapping table stored in the key value mapping storage module 117 according to an encoded value in the keyboard input instruction, so as to obtain a corresponding target key value.

In an embodiment, as illustrated in FIG. 4, the server 11 may further include an instruction sending module 115. If the computing module 113 determines that a target key is a "Delete", a corresponding click instruction may be directly generated and sent to the instruction sending module 115. The instruction sending module 115 is configured to send the received click instruction to the terminal device to be tested 14. For example, if the computing module 113 determines that the target key is a "Delete", an "adb shell input keyevent 67" is directly generated and sent to the instruction sending module 115. An "adb shell input keyevent" is a mapping instruction for key value events and the "adb shell input keyevent 67" is a mapping instruction for the "Delete" key. For another example, if the computing module 113 determines that the target key is a "Space", an "adb shell input keyevent 62" may be directly generated and sent to the instruction sending module 115. The "adb shell input keyevent 62" is a mapping instruction for the space key. If the computing module 113 determines that the target key is an "Enter", the "adb shell input keyevent 66" may be directly generated and sent to the instruction sending module 115. The "adb shell input keyevent 66" is a mapping instruction for the enter key. If the computing module 113 determines that the target key is other commonly used punctuation marks such as commas, periods and the like, the instruction sending module 115 directly generates a corresponding click instruction to send to the instruction sending module 115.

In an embodiment, if the computing module 113 determines that a target key is a number or a letter, it may detect whether the target key exists in a key-code library of the terminal device to be tested 14. If so, it performs step 203, otherwise, it directly terminates and returns. As such, delay and performance problems caused by useless image recognition may be avoided.

In step 203, acquiring the screen snapshot of the terminal device to be tested, and identifying whether a target key exists in the screen snapshot.

In an embodiment, as illustrated in FIG. 4, the server 11 may further include a snapshot analysis module 114. The snapshot analysis module 114 acquires a current screen snapshot of the terminal device to be tested 14 from the snapshot cache module 116 according to the identification of the terminal device to be tested 14 in the keyboard input instruction, and performs image recognition to determine whether a target key exists in the screen snapshot.

Figure 5:
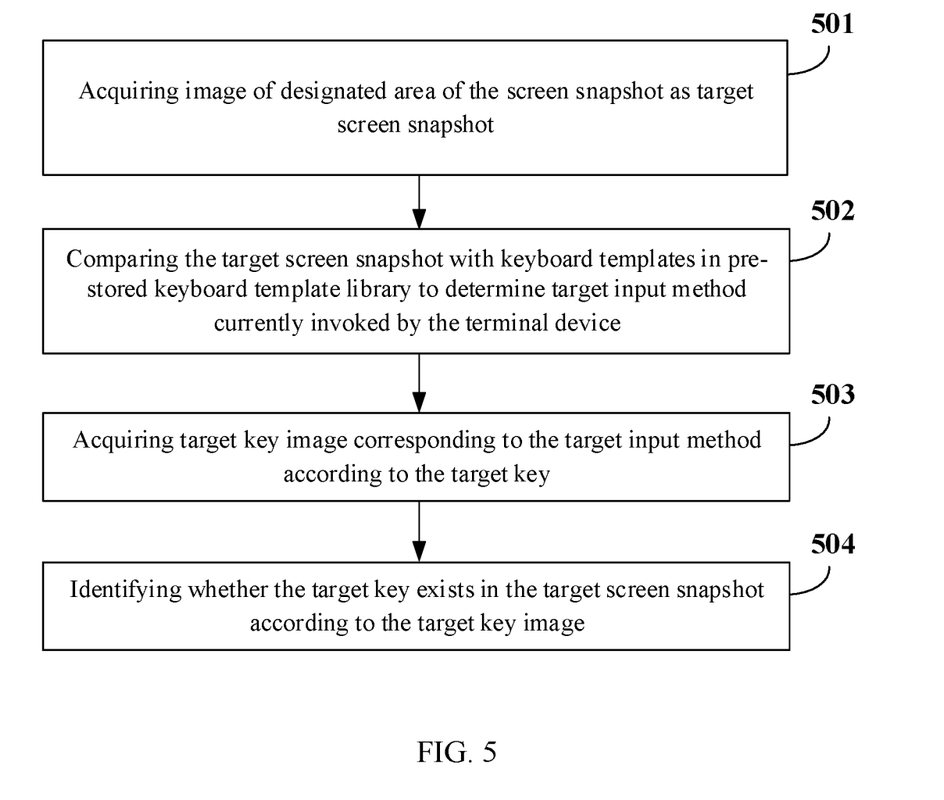
FIG. 5 is a flowchart of another remote information input method according to the embodiments of the present invention.

In an embodiment, the snapshot analysis module 114 may also determine whether a virtual keyboard in a target screen snapshot is in an alphabetic mode or a numeric mode. If it is in a numeric mode and the target key is also a number, a number corresponding to "adb shell input text" may be directly generated, and then sent to the instruction sending module 115 together with the identification of the terminal device to be tested 14, so as to send a corresponding click instruction to the terminal device to be tested 14. The "adb shell input text" is a mapping instruction for a text. For example, an "adb shell input text 6" is a mapping instruction for the 6 key. If the virtual keyboard in the target screen snapshot is in the numeric mode and the target key is a letter, the process above terminates and returns. If the virtual keyboard is in the alphabetic mode and the target key is a number, a number corresponding to "adb shell input text" is directly generated, and sent to the instruction sending module 115 together with the identification of the terminal device to be tested 14, so as to send a corresponding click instruction to the terminal device to be tested 14. If the virtual keyboard is in the alphabetic mode and the target key is a letter, as illustrated in FIG. 5, step 203 may further include the following steps 501 to 504:

In step 501, acquiring an image of a designated area of the screen snapshot to obtain a target screen snapshot.

Figure 6:
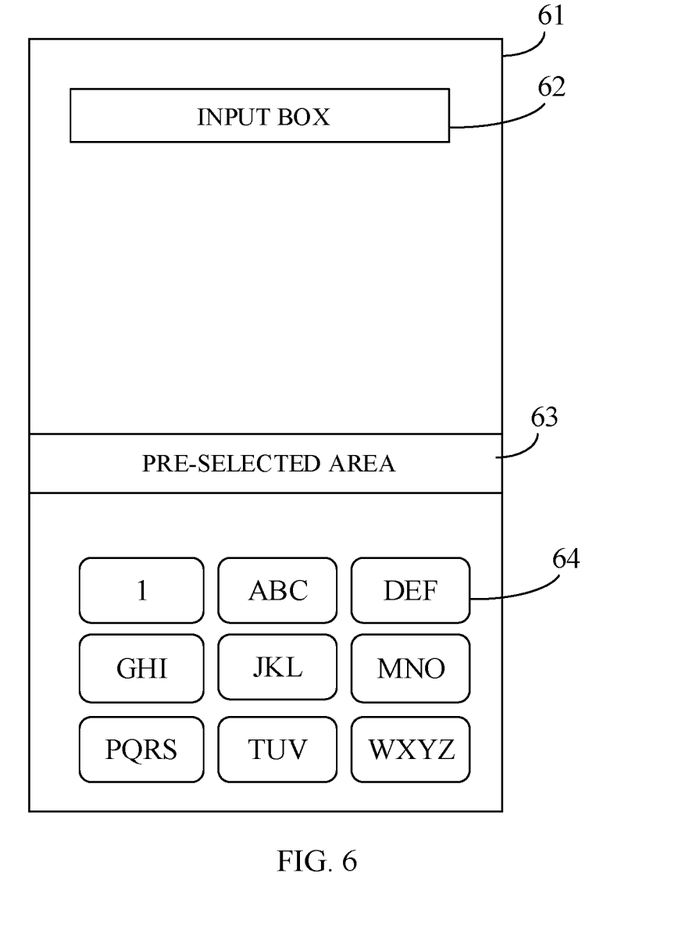
FIG. 6 is a schematic diagram of a terminal screen snapshot according to the embodiments of the present invention.

In an embodiment, as illustrated in FIG. 6, a current screen snapshot 61 of the terminal device to be tested 14 may include an input box 62, a pre-selected area 63 and virtual keys 64. A plurality of virtual keys 64 constitute a virtual keyboard. The virtual keyboard is located in a designated area of the screen snapshot 61, for example, the virtual keyboard is located in the lower half of the screen snapshot 61.

In an embodiment, in order to reduce the calculation amount of image recognition, an image of a designated area of a screen snapshot may be acquired to obtain a target screen snapshot. For example, a half-height image is taken from the captured real-time snapshot, and the lower half of the screen snapshot is taken to perform the template comparison step 502. The target screen snapshot includes virtual keys 64.

In step 502, comparing the target screen snapshot with keyboard templates in a pre-stored keyboard template library to determine a target input method currently invoked by the terminal device;

In an embodiment, in order to improve the accuracy of image recognition, a keyboard template library may be stored in advance. The keyboard template library stores keyboard templates corresponding to a plurality of input methods used by the terminal device to be tested 14. The snapshot analysis module 114 may compare the acquired target screen snapshot with keyboard templates in the pre-stored keyboard template library to determine the target input method currently invoked by the terminal device to be tested 14. For example, the snapshot analysis module 114 may employ an OpenCV (open source computer vision library) template function to compare the acquired target screen snapshot with the keyboard templates in the pre-stored keyboard template library one by one, so as to determine the target input method currently invoked by the terminal device to be tested 14. In practical application, it is not limited to the OpenCV template function. The keyboard template library may store as many keyboard templates corresponding to the input method as possible. As such, it may be applicable to the third-party input methods of different manufacturers and virtual keyboards with different layouts.

In step 503, acquiring a target key image corresponding to the target input method according to the target key value.

In an embodiment, key value images are different due to different input methods. For example, an image of "a" corresponding to Baidu input method and an image of "a" corresponding to Sogou input method may not be the same. In order to improve the accuracy of image recognition, the snapshot analysis module 114 may acquire a target key image corresponding to the target input method according to the target key value, and the process proceeds to step 504. The server 11 can store a key value image library for storing a plurality of key value images. The snapshot analysis module 114 may query the key value image library according to the target key so as to obtain a target key image corresponding to the target input method.

In step 504, identifying whether the target key exists in the target screen snapshot according to the target key image.

In an embodiment, the snapshot analysis module 114 may identify whether a target key exists in a target screen snapshot according to a target key image.

In step 204, acquiring a coordinate of the target key in a screen snapshot when the target key exists in the screen snapshot.

Figure 7:
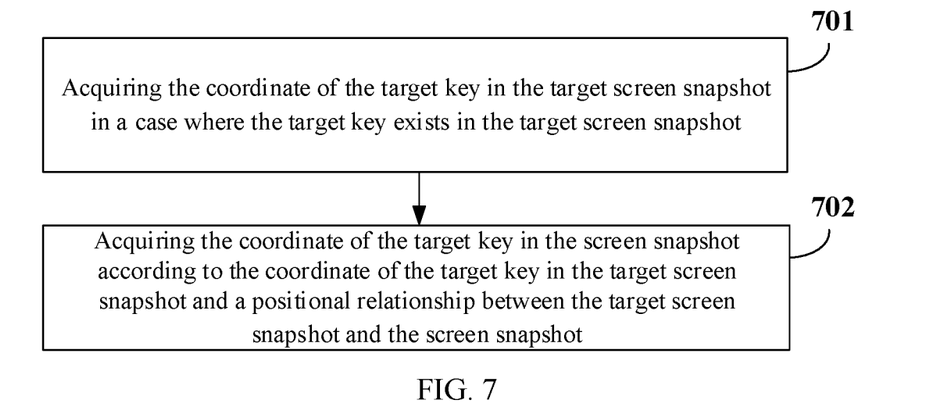
FIG. 7 is a flowchart of another remote information input method according to the embodiments of the present invention.

In an embodiment, as illustrated in FIG. 7, step 204 may include steps 701-702:

In step 701, acquiring the coordinates of the target key in the target screen snapshot in a case where the target key exists in the target screen snapshot;

In step 702, acquiring the coordinates of the target key in the screen snapshot according to the coordinate of the target key in the target screen snapshot and a positional relationship between the target screen snapshot and the screen snapshot.

In an embodiment, in a case where the target key exists in the target screen snapshot, and the acquired coordinates of the target key in the target screen snapshot are (3.6, 2.8). Further, the target screen snapshot is located in the lower half of the screen snapshot, and start coordinates of the screen snapshot are (0,0) and termination coordinates are (12,16), then the abscissa of the target key in the screen snapshot is equal to the abscissa 3.6 of the target key in the target screen snapshot, and the ordinate of the target key in the screen snapshot is equal to the ordinate of the target key in the target screen snapshot plus one half of the longitudinal length of the screen snapshot, i.e. 10.8. That is, the coordinates of the target key in the screen snapshot are (3.6, 10.8). The start position of the screen snapshot is the upper left corner and the termination position is the lower right corner.

In step 205, sending a click instruction to the terminal device to be tested according to the coordinate of the target key in the screen snapshot and the identification of the terminal device to be tested, so that the terminal device to be tested determines input information according to the click instruction.

In an embodiment, the snapshot analysis module 114 sends coordinates of the target key in the screen snapshot to the instruction sending module 115, and the instruction sending module 115 generates a corresponding click instruction: "adb shell input tap abscissa ordinate+identification", according to the coordinate of the target key in the screen snapshot and the identification of the terminal device to be tested 14 and sends it to the terminal device to be tested 14. The click instruction may not be limited to this. Where "+" is a delimiter used to separate the ordinate from the identification, and the delimiter may also be an asterisk "*" or other specified symbols, such as "&".

In an embodiment, if the target key does not exist in the target screen snapshot, the result returned by the snapshot analysis module 114 is empty, for example, the returned result is (0,0), and then the process is terminated and returned. In an embodiment, if the result returned by the snapshot analysis module 114 includes an "adb shell input text" or "adb shell input keyevent" instruction, then the instruction sending module 115 generates a click instruction according to the above instruction and the identification of the terminal device to be tested 14, and sends the click instruction to the terminal device to be tested 14.

In the embodiments of the present invention, when an input device displays a screen snapshot of a terminal device to be tested, if a keyboard input instruction is detected, then the keyboard input instruction is sent to a server, and the server determines a corresponding target key according to an encoded value in the received keyboard input instruction and a key code mapping table, and then the server acquires the screen snapshot of the terminal device to be tested and identifies whether the target key exists in the screen snapshot. In a case where the target key exists in the screen snapshot, the server acquires coordinates of the target key in the screen snapshot, and the server sends a click instruction to the terminal device to be tested according to the coordinate of the target key in the screen snapshot and an identification of the terminal device to be tested, and the terminal device to be tested determines input information according to the click instruction. As such, information may be input to a remote terminal device to be tested through a keyboard, and the efficiency and convenience of information input may be improved.

In the embodiments of the present invention, characters may be directly input to a remote device through a keyboard, and the mapping from a physical keyboard to a virtual keyboard may improve the simulation effect and further improve the use experience.

Figure 8:
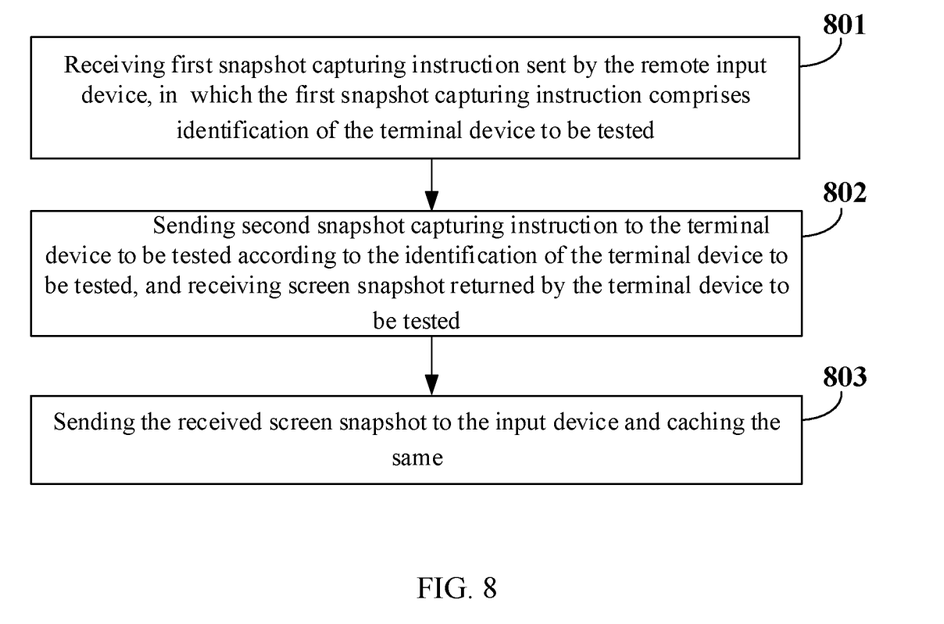
FIG. 8 is a flowchart of another remote information input method according to the embodiments of the present invention.

The embodiments of the present invention also provide an information input method. As illustrated in FIG. 8, the information input method in these embodiments further includes the following steps 801 to 803 on the basis of the embodiments illustrated in FIG. 2.

In step 801, receiving a first snapshot capturing instruction sent by the input device. The input device sends the first snapshot capturing instruction to the server, upon receiving a keyboard input instruction for the first time or after receiving a message that the terminal device to be tested is successfully connected with the server. And the first snapshot capturing instruction comprises an identification of the terminal device to be tested;

In step 802, sending a second snapshot capturing instruction to the terminal device to be tested according to the identification of the terminal device to be tested, and receiving a screen snapshot returned by the terminal device to be tested.

In step 803, sending and caching a received screen snapshot to the input device.

In an embodiment, the input device 12 sends a first snapshot capturing instruction to the server 11 upon receiving a keyboard input instruction for the first time or after receiving a message that that the terminal device to be tested 14 is successfully connected to the server 11. The first snapshot capturing instruction includes an identification of the terminal device to be tested 14. After receiving the first snapshot capturing instruction, the server 11 sends a second snapshot capturing instruction to the terminal device to be tested 14 according to the identification of the terminal device to be tested 14, and receives the screen snapshot returned by the terminal device to be tested 14. The server 11 sends a received screen snapshot to the input device 12 for display, and cache the received screen snapshot.

In an embodiment, after the terminal device to be tested 14 is successfully connected to the server 11, a first screen snapshot of a screen of the terminal device to be tested 14 may be obtained through Media Projection and Virtual Surface.

In this embodiment, because the input device may send the first snapshot capturing instruction to the server upon receiving the keyboard input instruction for the first time or after receiving the message that the terminal device to be tested is successfully connected to the server, thus, a current screen snapshot of the terminal device to be tested may be acquired in time so as to avoid affecting information input.

Figure 9:
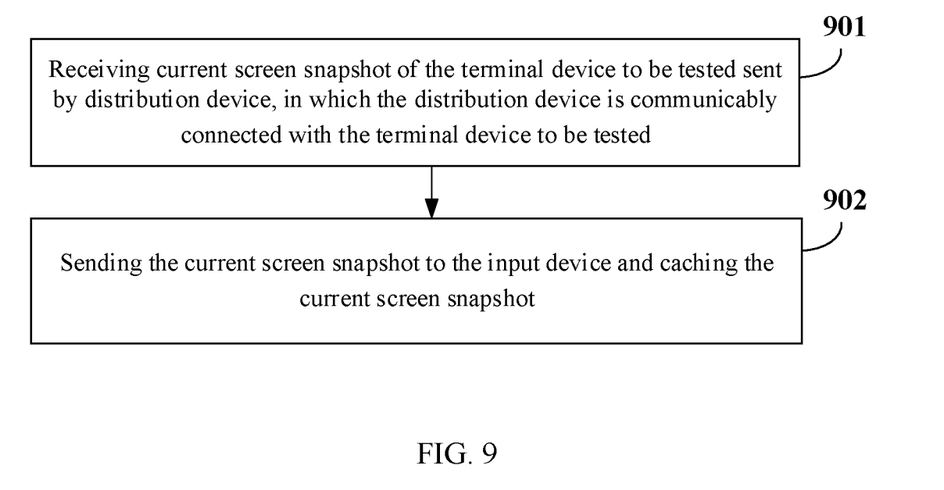
FIG. 9 is a flowchart of yet another remote information input method according to the embodiments of the present invention.

The embodiments of the present invention also provide an information input method. As illustrated in FIG. 9, the information input method in these embodiments further includes the following steps 901-902 on the basis of the embodiments illustrated in FIG. 2:

In step 901, receiving a current screen snapshot of the terminal device to be tested sent by a distribution device. The distribution device acquires a current screen snapshot when detecting that the image displayed on the terminal device to be tested changes, and sends the current screen snapshot to the server. And the distribution device is communicably connected with the terminal device to be tested.

In step 902, sending and caching the current screen snapshot to the input device.

In an embodiment, the distribution device 13 may detect a screen of the terminal device to be tested 14, when detecting that an image displayed on the terminal device to be tested 14 changes, the distribution device 13 acquires a current screen snapshot of the terminal device to be tested 14, and sends the current screen snapshot of the terminal device to be tested 14 and an identification of the terminal device to be tested 14 to the server 11. After receiving the current screen snapshot of the terminal device to be tested 14 sent by the distribution device 13, the server 11 updates the cached screen snapshot of the terminal device to be tested 14 and sends the received screen snapshot of the terminal device to be tested 14 to the input device 12 so as to update the screen snapshot of the terminal device to be tested 14 and prevent the unsynchronized screen snapshot from affecting information input. In an embodiment, the distribution device 13 may monitor the screen of the terminal device to be tested 14 through ImageReader::setOnImageAvailableListener (which actively notifies the observer when the observed (screen content) changes and transmits the changed result to the observer), but is not limited thereto.

In this embodiment, the distribution device may acquire the current screen snapshot when detecting that the image displayed on the terminal device to be tested changes, and send the current screen snapshot to the server, so that the server may send the current screen snapshot to the input device and cache it. As such, the unsynchronized screen snapshot may be prevented from affecting information input.

The embodiments of the invention also provide an information input method, which is applied to input devices. The method comprises the following steps:

Sending a keyboard input instruction detected when displaying a screen snapshot of a terminal device to be tested to a server, in which the keyboard input instruction comprises an identification of the terminal device to be tested and an encoded value, so that the server determines a corresponding target key according to the encoded value and a key code mapping table, acquires the screen snapshot of the terminal device to be tested, identifies whether a target key exists in a screen snapshot, and in a case where the target key exists in the screen snapshot, acquires coordinates of the target key in the screen snapshot, and sends a click instruction to the terminal device to be tested according to the coordinate of the target key in the screen snapshot and the identification of the terminal device to be tested, thereby, the terminal device to be tested determines input information according to the click instruction.

The information input method in this embodiment is similar to the information input method in the above embodiments and will not be repeated here.

Figure 10:
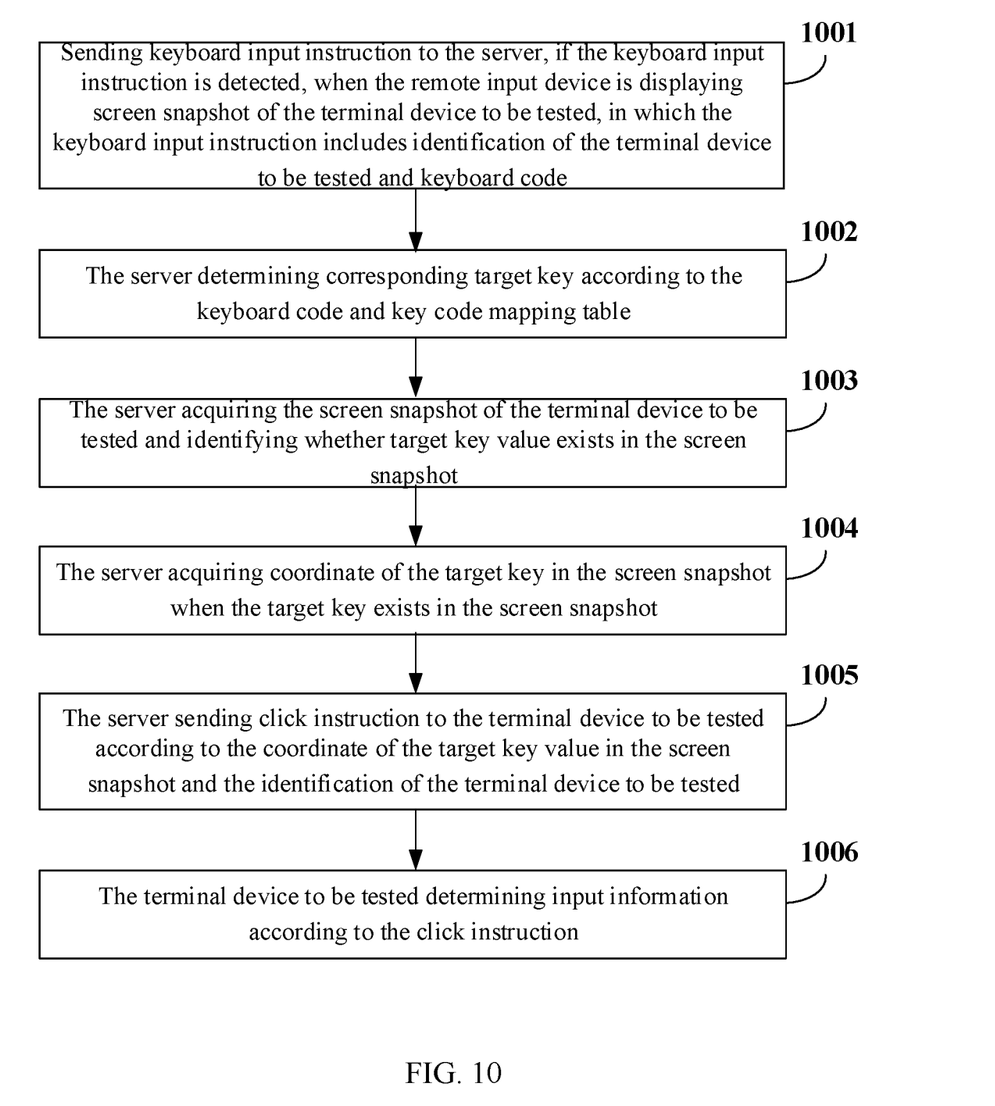
FIG. 10 is a flowchart of still another remote information input method according to the embodiments of the present invention.

The embodiments of the present invention also provide an information input method. As illustrated in FIG. 10, the information input method may be applied to the information input system as illustrated in FIG. 1. The information input system may include an input device, a server and a terminal device to be tested. The input device is communicably connected with the server, and the server is communicably connected with the terminal device to be tested. The information input method may include the following steps 1001 to 1006:

In step 1001, sending a keyboard input instruction to the server, if the keyboard input instruction is detected, when the input device is displaying a screen snapshot of the terminal device to be tested. The keyboard input instruction includes an identification of the terminal device to be tested and an encode value.

In step 1002, the server determining a corresponding target key according to the encoded value and a key code mapping table.

In step 1003, the server acquiring the screen snapshot of the terminal device to be tested and identifying whether a target key exists in the screen snapshot.

In step 1004, the server acquiring a coordinate of the target key in the screen snapshot when the target key exists in the screen snapshot.

In step 1005, the server sending a click instruction to the terminal device to be tested according to the coordinate of the target key in the screen snapshot and the identification of the terminal device to be tested.

In step 1006, the terminal device to be tested determining input information according to the click instruction.

The information input method in this embodiment is similar to the information input method in the above embodiments and will not be repeated here.

Figure 11:
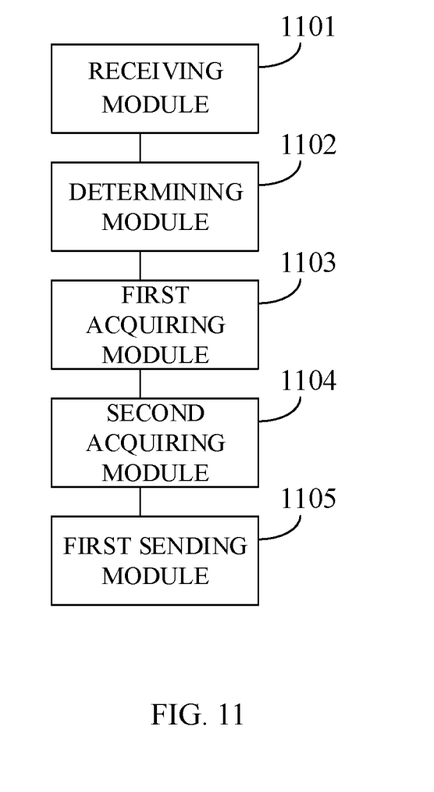
FIG. 11 is a block diagram of a server device according to the embodiments of the present invention.

The embodiments of the present invention also provide an information input device, which may be applied to a server, but is not limited thereto. As illustrated in FIG. 11, the device includes:

a receiving module 1101, configured to receive a keyboard input instruction detected by an input device when displaying a screen snapshot of a terminal device to be tested, in which the keyboard input instruction includes an identification of the terminal device to be tested and an encoded value;

a determining module 1102, configured to determine a corresponding target key according to the encoded value and a key code mapping table;

a first acquiring module 1103, configured to acquire the screen snapshot of the terminal device to be tested and identify whether a target key exists in the screen snapshot;

a second acquiring module 1104, configured to obtain coordinates of the target key in the screen snapshot in a case where the target key exists in the screen snapshot; and a first sending module 1105, configured to send a click instruction to the terminal device to be tested according to the coordinate of the target key in the screen snapshot and the identification of the terminal device to be tested, so that the terminal device to be tested may determine input information according to the click instruction.

The receiving module 1101 and the first sending module 1105 may be communication components which are configured to facilitate wired or wireless communication between the information input device and other devices. The information input device may access a wireless network based on a communication standard, such as WiFi, 2G or 3G 4G LTE, 5G NR, or combinations thereof. In an exemplary embodiment, a communication component receives a broadcast signal or broadcast related information from an external broadcast management system via a broadcast channel. In an exemplary embodiment, the communication component further includes a near field communication (NFC) module to facilitate short-range communication. For example, the NFC module may be implemented based on radio frequency identification (RFID), infrared data association (IrDA), ultra-wideband (UWB), blue tooth (BT) and other technologies.

The embodiments of the invention further provide an information input device, which comprises:

a second sending module, configured to send a keyboard input instruction detected when displaying a screen snapshot of a terminal device to be tested to a server, in which the keyboard input instruction includes an identification of the terminal device to be tested and an encoded value, so that the server determines a corresponding target key according to the encoded value and a key code mapping table, acquires the screen snapshot of the terminal device to be tested, identifies whether a target key exists in the screen snapshot, and in a case where the target key exists in the screen snapshot, acquires coordinates of the target key in the screen snapshot, and sends a click instruction to the terminal device to be tested according to the coordinate of the target key in the screen snapshot and the identification of the terminal device to be tested, so that the terminal device to be tested determines input information according to the click instruction.

The embodiments of the present invention also provide an information input system, as illustrated in FIG. 1, which includes an input device 12, a server 11, and terminal devices to be tested 14 and 15. The input device 12 is communicably connected with the server 11, and the server 11 is communicably connected with the terminal devices to be tested 14 and 15.

The input device 12 is configured to send a keyboard input instruction to the server when displaying a screen snapshot of the terminal device to be tested and detecting the keyboard input instruction. And the keyboard input instruction includes an identification of the terminal device to be tested and an encoded value;

The server 11 is configured to determine a corresponding target key according to the encoded value and a key code mapping table;

The server 11 is also configured to acquire the screen snapshot of the terminal device to be tested and identify whether a target key exists in the screen snapshot;

The server 11 is further configured to acquire coordinates of the target key in the screen snapshot in a case where the target key exists in the screen snapshot;

The server 11 is still configured to send a click instruction to the terminal device to be tested according to the coordinate of the target key in the screen snapshot and the identification of the terminal device to be tested;

The terminal devices to be tested 14, 15 are configured to determine input information according to the click instruction.

In another example, the present invention may be used to remotely control terminal device to input Chinese. The test platforms in related technologies only support users to operate virtual keyboards of mobile phones through mouse. According to the method of the invention, the input may be carried out through the keyboard of the remote input device, addition to the mouse, and Chinese characters may be input. In this case, the structure of the system is similar to that illustrated in FIG. 1, and the distribution device may not be provided if there is only one terminal device. The working principle of each constituent part of the system is the same as that described above in connection with the test terminal application scenario, and will not be repeated here.

It should be noted that the remote information input method of the present invention may also be used for remotely controlling terminals, for example, using chat tools to communicate, operating e-mail boxes to send mails, logging on APPs on the terminals and operating, etc. According to the remote information input method and system of the invention, because a screen of the remote input device and a screen of the terminal are synchronized, when a user clicks on the mouse and keyboard of the remote input device, the visual effect of simulating the user clicking on the virtual keyboard is displayed on the screen of the terminal and the synchronized remote input device, so that the sense of reality is strong, and the user experience is good.

Figure 12:
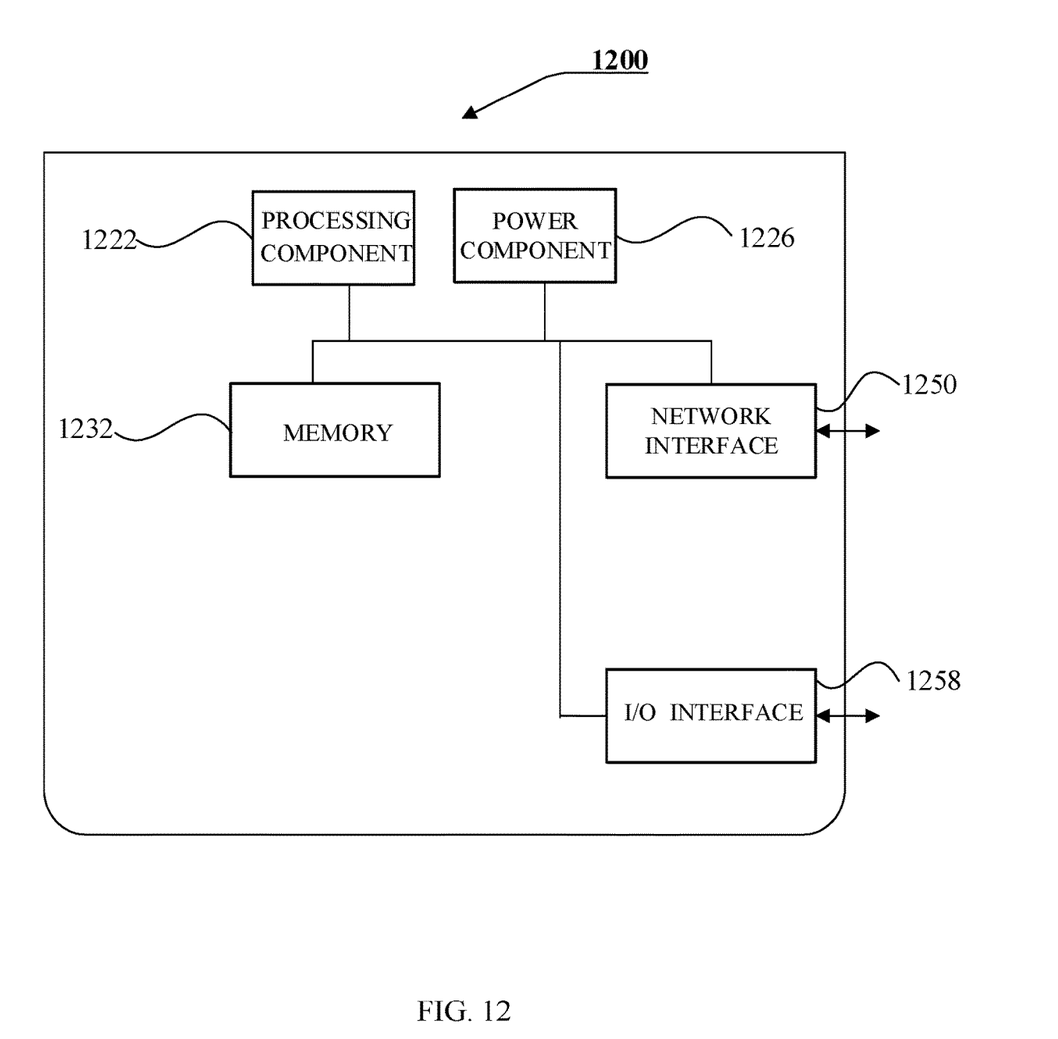
FIG. 12 is a block diagram of a terminal device according to the embodiments of the present invention.

FIG. 12 is a block diagram of a terminal device according to an exemplary embodiment. For example, the device 1200 may be provided as a server. Referring to FIG. 12, the device 1200 includes a processing component 1222 which further includes one or more processors, and memory resources represented by memory 1232 for storing instructions executable by the processing component 1222, such as application programs. The application program stored in the memory 1232 may include one or more modules each corresponding to a set of instructions. In addition, the processing component 1222 is configured to execute instructions to perform the information input method described above.

The device 1200 may further include a power component 1226 configured to perform power management of the device 1200, a wired or wireless network interface 1250 configured to connect the device 1200 to a network, and an input/output (I/O) interface 1258. The device 1200 may operate based on an operating system stored in the memory 1232, such as Windows Server™, Mac OS X™, Unix™, Linux™, FreeBSD™, or the like.

In an exemplary embodiment, there is also provided a non-transitory computer readable storage medium including instructions, such as the memory 1232 including instructions, which may be executed by the processing component 1222 of the device 1200 to complete the above method. For example, the non-transitory computer readable storage medium may be ROM, random access memory (RAM), CD-ROM, magnetic tape, floppy disk, optical data storage device, etc.

To sum up, the present invention provides a device, system and method for remote character entry that cannot be implemented by the traditional Android Debug Bridge under a cloud service platform. The input effect is implemented by analyzing a physical keyboard instruction, then identifying a position of a virtual keyboard and a position of a target picture, and simulating clicking on the virtual keyboard with the aid of a click instruction. And through instruction screening and judgment, the instructions that do not need to be identified are filtered out, further improving the efficiency of the remote input.

In the present invention, the terms "first" and "second" are only for descriptive purposes and are not to be interpreted as indicating or implying relative importance. The term "plurality" refers to two or more, unless otherwise clearly defined.

Other implementations of the present invention will be easily conceived of by those skilled in the art based on the specification and practice of the invention disclosed herein. The present invention is intended to cover any variation, use or adaptation of the present invention, which follows the general principles of the present invention and includes common knowledge or conventional technical means in the technical field not disclosed by the present invention. The specification and embodiments are to be considered as exemplary only, with the true scope and spirit of the invention being indicated by the following claims.

It should be understood that the present invention is not limited to the precise structures already described above and illustrated in the drawings, and various modifications and changes may be made without departing from the scope thereof. The scope of the present invention is limited only by the appended claims.

What is claimed is:

1. A remote information input method, applied to a server device, comprising:
   receiving a screen snapshot of a terminal device and sending the screen snapshot to a remote input device;
   receiving a keyboard input instruction from the remote input device, wherein the keyboard input instruction comprises an identification of the terminal device and a keyboard code;
   determining a target key in the terminal device based on the keyboard code and a key code mapping table;
   identifying the screen snapshot of the terminal device and determining whether the target key exists in the screen snapshot;
   acquiring a coordinate of the target key in a screen snapshot in response to determining that the target key exists in the screen snapshot; and
   sending a click instruction to the terminal device, according to the coordinate of the target key in the screen snapshot and the identification of the terminal device.

2. The method of claim 1, further comprising:
   receiving a mouse input instruction from the remote input device, wherein the mouse input instruction comprises the identification of the terminal device and a location coordinate of a mouse click.

3. The method of claim 2, wherein the method is used for terminal device testing, and the terminal device is at least one terminal device to be tested.

4. The method of claim 1, further comprising:
   receiving a first snapshot capturing instruction sent by the remote input device, wherein the first snapshot capturing instruction comprises the identification of the terminal device;
   sending a second snapshot capturing instruction to the terminal device according to the identification of the terminal device, and receiving a screen snapshot returned by the terminal device; and
   sending the received screen snapshot to the remote input device and caching the screen snapshot in the server device.

5. The method of claim 1, further comprising:
   receiving a current screen snapshot of the terminal device sent by a distribution device, wherein the distribution device is communicably connected with the terminal device; and
   sending the current screen snapshot to the remote input device and caching the current screen snapshot in the server device.

6. The method of claim 1, before acquiring the screen snapshot of the terminal device and identifying whether the target key exists in the screen snapshot, the method further comprising:
   detecting whether the target key exists in a key-code library of the terminal device; and
   if yes, acquiring the screen snapshot of the terminal device and identifying whether the target key exists in the screen snapshot.

7. The method of claim 1, wherein the acquiring the screen snapshot of the terminal device and identifying whether the target key exists in the screen snapshot comprises:
   acquiring an image of a designated area of the screen snapshot as a target screen snapshot;
   comparing the target screen snapshot with keyboard templates in a pre-stored keyboard template library to determine a target input method currently invoked by the terminal device;
   acquiring a target key image corresponding to the target input method according to the target key; and
   identifying whether the target key exists in the target screen snapshot according to the target key image.

8. The method of claim 7, wherein, in a case where the target key exists in the screen snapshot, acquiring the coordinates of the target key in the target screen snapshot comprises:
   acquiring a coordinate of the target key in the target screen snapshot in a case where the target key exists in the target screen snapshot; and
   acquiring the coordinate of the target key in the screen snapshot according to the coordinate of the target key in the target screen snapshot and a positional relationship between the target screen snapshot and the screen snapshot.

9. A remote information input method, applied to an information input system which comprises a remote input device, a server and a terminal device, the remote input device being communicably connected with the server, and the server being communicably connected with the terminal device, the method comprising:
   synchronizing a screen of the remote input device with a screen of the terminal device;
   monitoring, by the remote input device, an input instruction, and sending a detected input instruction to the server, wherein the input instruction comprises a keyboard input instruction, and the keyboard input instruction comprises a keyboard code and an identification of the terminal device;

receiving, by the server, a screen snapshot of the terminal device in response to the input instruction and determining a corresponding target key in the terminal device based on the keyboard code and a key code mapping table;

identifying, by the server, the screen snapshot of the terminal device and determining whether the target key exists in the screen snapshot;

acquiring, by the server, a coordinate of the target key in a screen snapshot in response to determining that the target key exists in the screen snapshot;

sending, by the server, a click instruction to the terminal device according to the coordinate of the target key in the screen snapshot and the identification of the terminal device; and determining, by the terminal device, input information according to the click instruction.

10. A remote information input system comprising: a remote input device, a server and a terminal device, the input device being communicably connected with the server, and the server being communicably connected with the terminal device, wherein:

a screen of the remote input device is synchronized with a screen of the terminal device;

the remote input device is configured to monitor an input instruction which comprises a keyboard input instruction that comprises a keyboard code and an identification of the terminal device, and sends a detected input instruction to the server;

the server is configured to, in response to the input instruction, receive a screen snapshot of the terminal device and determines a corresponding target key in the terminal device based on the keyboard code and a key code mapping table;

the server is further configured to identify the screen snapshot of the terminal device and determines whether a target key exists in a screen snapshot;

the server is further configured to, in response to determining that the target key exists in the screen snapshot, acquire coordinates of the target key in the screen snapshot;

the server is further configured to send a click instruction to the terminal device according to the coordinate of the target key in the screen snapshot and the identification of the terminal device; and the terminal device is configured to determine input information according to the click instruction.

11. The system of claim 10, further comprising a distribution device, wherein the distribution device is communicably connected with the server and the terminal device, and the distribution device sends a current screen snapshot of the terminal device to the server, and sends a click instruction of the server to the terminal device.

12. The system of claim 10, wherein the server is further configured to receive a mouse input instruction from the remote input device, and the mouse input instruction comprises an identification of the terminal device and a location coordinate of a mouse click.

13. The system of claim 12, wherein the system is used for terminal device testing, and the terminal device is at least one terminal device to be tested.

14. A server device, comprising a processor and a memory, wherein the memory is used for storing computer programs; and the processor is used for executing computer programs stored on the memory to perform the method of claim 1.

15. A computer-readable storage medium, wherein the computer-readable storage medium stores computer programs that when executed by a processor cause the processor to perform the method of claim 1.

* * * * *